United States Patent Office 3,535,498
Patented Oct. 20, 1970

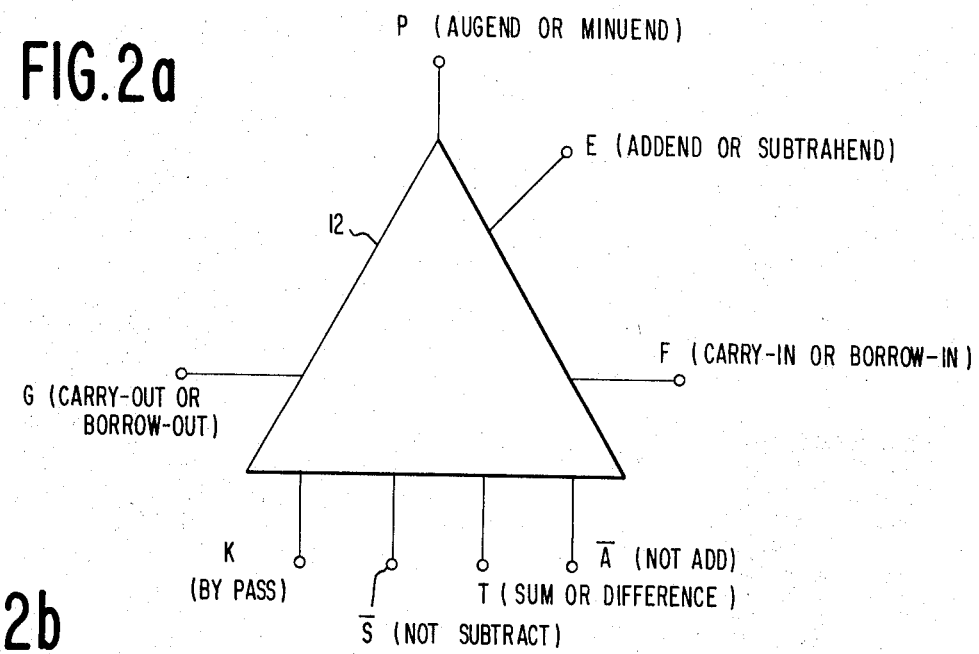
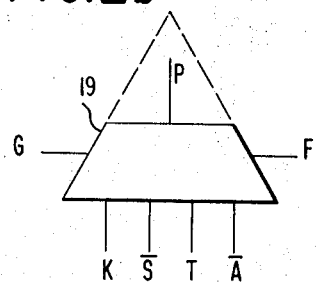
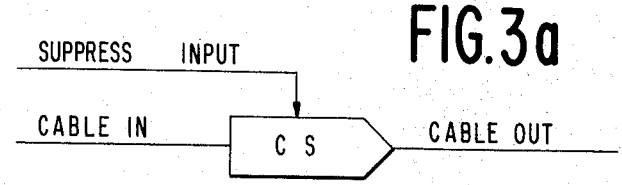
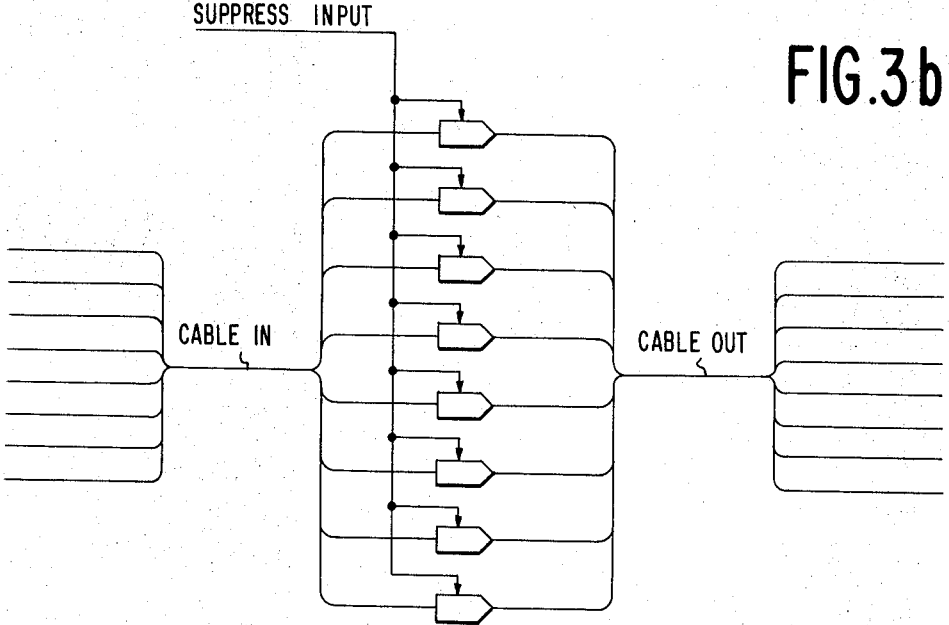

3,535,498
MATRIX OF BINARY ADD-SUBTRACT ARITHMETIC UNITS WITH BYPASS CONTROL
Louis G. Smith, Jr., Pontiac, Mich., assignors to Detrex Chemical Industries, Inc., Detroit, Mich., a corporation of Michigan
Filed May 2, 1967, Ser. No. 635,552
Int. Cl. G06f 7/38, 5/02; H03k 5/00
U.S. Cl. 235—164
23 Claims

ABSTRACT OF THE DISCLOSURE

A calculating matrix of binary add-subtract arithmetic units, each having a bypass control feature, for performing multiplication, division, squaring, root taking, addition, subtraction, or the conversion between binary and binary-coded decimal numbers. The matrix is arranged in a slant array extending from upper left to lower right to accommodate multiplication and division operations using the minimum number of matrix elements. Furthermore, when an unsatisfied borrow, i.e., a negative difference or remainder, occurs during a trial subtraction in root taking and division operations, a bypass control signal is generated to inhibit the subtraction and bypass the subtrahend or regenerate the minuend to make it, the minuend, available for a subsequent trial subtraction. In the root taking operation, the matrix elements of the array are placed in a binary one or a binary zero state in accordance with a specially oriented array of the partial products for the square of a number. A control signal produced by the generation of an unsatisfied borrow in a row of the array causes all elements of that row to be effectively bypassed and also converts to zero or inhibits the elements of the slant column containing the controlling term of that row.

---

This invention relates generally to improved digital computing apparatus and methods, and more particularly to such an apparatus incorporating an improved calculating matrix and improved control means therefor for efficiently performing root taking, division, multiplication, etc.

In the prior art, a matrix used for multiplication required a slant array extending from the upper right to the lower left for presenting or holding sums representing partial products. However, a division matrix requires a matrix arranged in an array extending from upper left to lower right for assembling differences representing partial quotients. Consequently, a rectangular array was required to accommodate both slant arrays. Of course, such an array is inherently inefficient since many matrix elements were unused during a particular calculation.

In addition, prior art computers required external number change detectors for determining a change in the input number, and dividers and square rooters also required special external circuits for correcting a partial quotient produced by a trial subtraction which resulted in a negative difference or unsatisfied borrow. Furthermore, prior art square rooters involved in one form or another the technique of subtracting successive odd numbers from a number whose square root was to be determined.

Therefore, it is an object of the invention to provide an improved general purpose digital arithmetic complex having reduced wiring and interconnection requirements.

A further object of the invention is to provide a digital arithmetic computational complex having its various elements organized in such a manner as to achieve optimum efficiency with respect to parts usage, time usage, etc.

Still another object of the invention is to provide such a complex having a matrix spatially arranged such that it is suitable for performing, without major reorganization, the great diversity of mathematical operations required of modern computers.

A more specific object of the invention is to provide a digital arithmetic computing complex having a single matrix spatially arranged in an array for performing both multiplication and also root taking or division.

Another object of the invention is to provide such a digital arithmetic complex having an interconnection format and mode of operation readily adaptable to modern electronic elements, such as monolithic circuits, wherein a great number of circuit elements are formed by manual, semi-automatic or fully automatic techniques on a single supporting surface, such as a silicon wafer or chip.

Still another object is to provide such an improved complex whose function and operation are more easily apparent and understandable to non-specifically trained human beings, who, in the last resort, must use, repair and operate it.

Another very important object of the invention is to provide an improved digital arithmetic computing complex in which all results or partial results are directly and continuously responsive to the input numbers, be they augend and addend, divisor and dividend, etc. without the need for a separate number change detecting circuit not a part of the actual calculation circuits.

Another specific object of the invention is to provide an improved digital calculating matrix array for computing square roots by a more direct method than was possible with prior art calculators. Included in this sense is a novel device for generating an improved array for storage either in a memory or in a calculating matrix or for use step-by-step in a serial or block-serial type calculator.

An even more specific object of the invention is to provide an improved digital computing matrix for dividing and root taking, and having control means both for inhibiting a trial subtraction which produces an unsatisfied borrow or negative remainder, and also for bypassing the subtrahend number or regenerating the minuend number to make the minuend number available for a subsequent trial subtraction.

Another specific object is to provide such a computing matrix in which all the matrix elements in the row of the array corresponding to an improper trial subtraction are inhibited from affecting the matrix sum or difference and also the matrix elements of the slant column of the array containing the controlling term of the inhibited row are caused to present a zero bit.

An additional object is to provide such a digital arithmetic complex for converting between binary and decimal number systems.

Other objects, features, and advantages of the invention will be apparent from the following more particular description of preferred embodiments of the invention, as illustrated in the accompanying drawings.

In the drawings:

FIG. 2a is an enlarged schematic diagram of a full arithmetic unit showing its input and control terminals;

FIG. 2b is a schematic diagram of a half unit adapted to include a borrow/carry input, but no addend/subtrahend input;

FIG. 3a is a schematic diagram of a cable suppressor designed to suppress simultaneously signals on all paths of a cable and FIG 3b is a schematic diagram showing the individual suppressors in the cable suppressor;

FIG. 7b is a time chart of the circuit of FIG. 7a;

$$a + b + c + d + e + f$$
$$a + b + c + d + e + f$$

$$aa + ab + ac + ad + ae + af$$
$$+ ab \qquad bb \quad bc \quad bd \quad be \quad bf$$
$$+ ac \qquad\qquad bc \qquad cc \quad cd \quad ce \quad cf$$
$$+ ad \qquad\qquad\quad bd \qquad cd \qquad dd \quad de \quad df$$
$$+ ae \qquad\qquad\qquad be \qquad ce \qquad de \quad ee \quad ef$$
$$+ af \qquad\qquad\qquad\quad bf \qquad cf \qquad df \quad ef \quad ff$$

$$aa + 2ab + 2ac + 2ad + 2ae + 2af + bb + 2bc + 2bd + 2be + 2bf + cc + 2cd + 2ce + 2cf + dd + 2de + 2df + ee + 2ef + ff \quad (10)$$

Figure 9:
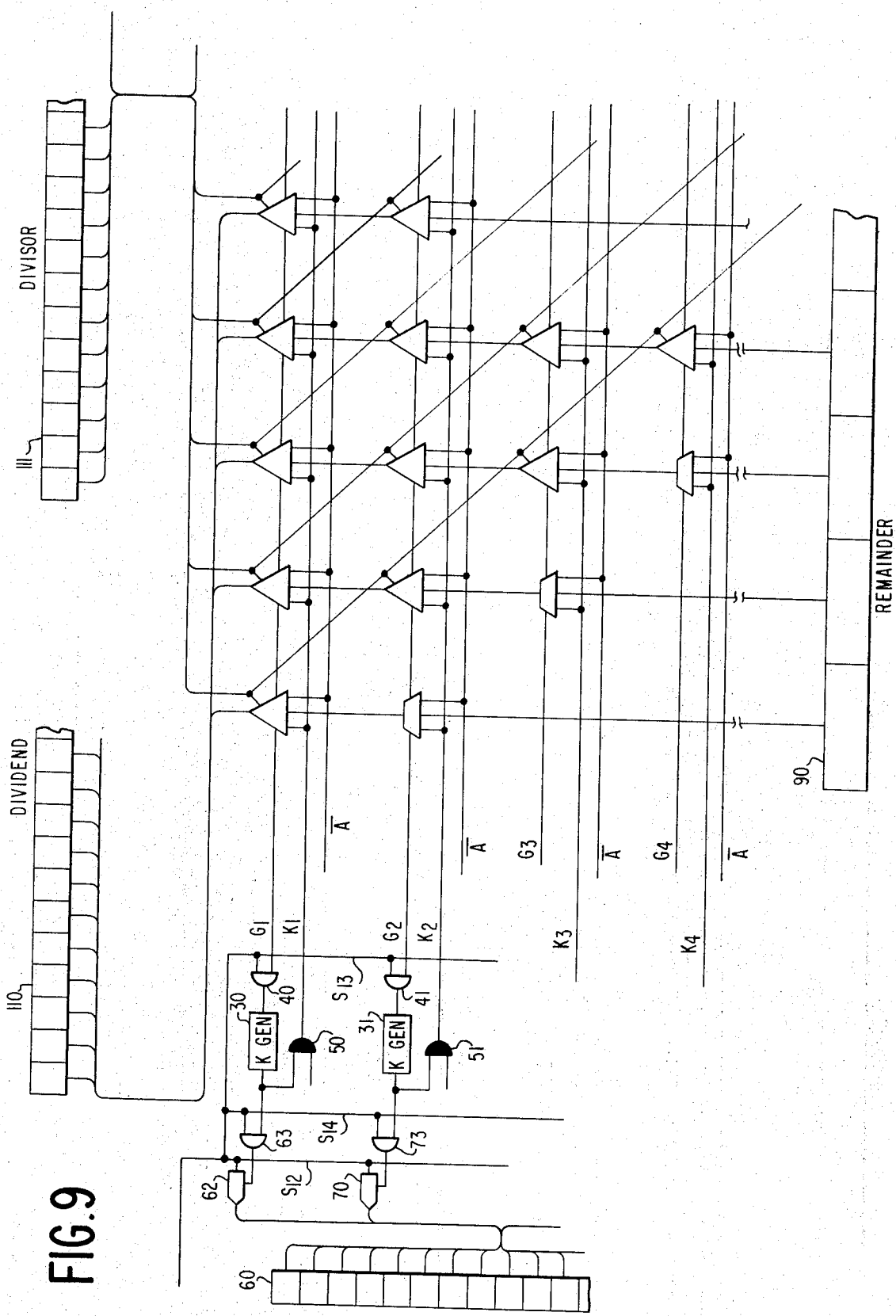
Figure 10:
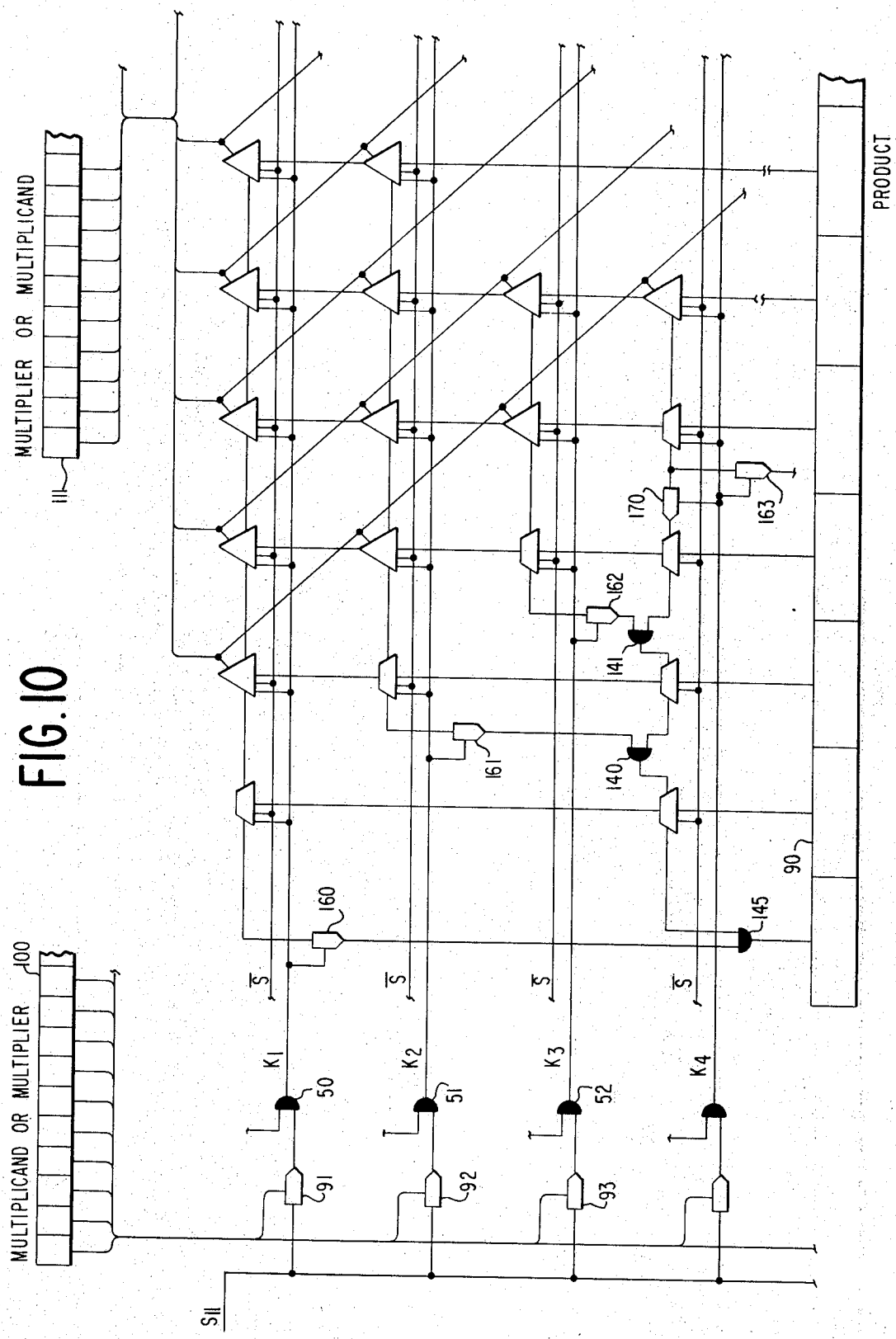

FIG. 9 is a schematic diagram illustrating the matrix interconnections required for division; and FIG. 10 is a schematic diagram illustrating the matrix interconnections required for multiplication.

A brief discussion of number systems will help the reader better to understand and appreciate the noval aspects of the invention. The various number systems used in our society are established in terms of a radix and conventionally written such that the figure farthest to the right is considered to be a multiplier of the radix raised to the zero power ($n^0 = 1$). The number second from the right is a multiplier of the radix raised to the first power ($n^1 = n$). The number third from the right is a multiplier of the radix raised to the second power, etc. It is understood that these products are additive and, furthermore, that the spatial arrangement of these numbers is such that the column farthest to the right represents the radix to the zero power, second from the right the radix to the first power, third from the right the radix to the second power, etc.

Thus, the number 133 (radix 10) is constructed as:

$$10^2 \times 1 + 10^1 \times 3 + 10^0 \times 3 \qquad (1)$$

Similarly, 133 described in a radix 2 system would be constructed $$2^7 \times 1 + 2^6 \times 0 + 2^5 \times 0 + 2^4 \times 0 + 2^3 \times 0 + 2^2 \times 1 + 2^1 \times 0 + 2^0 \times 1 \qquad (2)$$

and is conventionally written as:

$$10000101 \qquad (3)$$

Once this spatial relationship is established, it is then possible to represent any number as:

$$abc \qquad (4)$$

and that the number to some radix, $n$, is constructed as:

$$an^2 + bn^1 + cn^0 \qquad (5)$$

In order to show that the term $a$ in the previous number is actually "$a$ times the radix $n^2$", it is the custom to write it, when it stands alone, as $a$ followed by two zeros, i.e., $$a00 \qquad (6)$$

which means:

$$an^2 + 0n^1 + 0n^0 \qquad (7)$$

It follows then, that a six-place number can be written as:

$$a + b + c + d + e + f \qquad (8)$$

By definition, the square of a number is that number multiplied by itself and is designated as:

$$(a + b + c + d + e + f)^2 \qquad (9)$$

This operation can be performed in the conventional manner as:

(10a)

If it is remembered that the $a$ term is actually an $a$ followed by five zeros, then it becomes apparent that the $a \, a$ term is in reality $a^2$ followed by ten zeros. Similarly, the $a \, b$ term is actually $ab$ followed by nine zeros since the actual factors of this product are $a$ followed by five zeros and $b$ followed by four zeros. Continuing this process, it is possible to build a table showing the significant terms in rows in accordance with the number of following zeros:

| No. of Zeros | Significant Terms | | | | | |
|---|---|---|---|---|---|---|
| 10 | aa | | | | | |
| 9 | ab | | | | | |
| 8 | ac | bb | | | | |
| 7 | ad | bc | | | | |
| 6 | ae | bd | cc | | | |
| 5 | af | be | cd | | | |
| 4 | | bf | ce | dd | | |
| 3 | | | cf | de | | |
| 2 | | | | df | ee | |
| 1 | | | | | ef | |
| 0 | | | | | | ff |

(11)

The summation terms from Example 10 can be arranged in a slant array by rows in accordance with the least significant term and by columns in accordance with the number of zeros in each term to form the following array in which each slant or diagonal column contains all terms of the same order, i.e., the first slant column contains all of the highest order ($a$) terms, the next slant column all the second highest ($b$) terms, etc.:

| Number of Zeros | | | | | | | | | | |
|---|---|---|---|---|---|---|---|---|---|---|
| 10 | 9 | 8 | 7 | 6 | 5 | 4 | 3 | 2 | 1 | 0 |
| aa | | | | | | | | | | |
| | 2ab | bb | | | | | | | | |
| | | 2ac | 2bc | cc | | | | | | |
| | | | 2ad | 2bd | 2cd | dd | | | | |
| | | | | 2ae | 2be | 2ce | 2de | ee | | |
| | | | | | 2af | 2bf | 2cf | 2df | 2ef | ff |

(12

The array (12) is perfectly general and represents the table of partial products necessary to compute the square of any six-digit number regardless of radix. However, the use of radix 2 numbers produces a simplication of the array. In radix 2 arithmetic, a multiplication of a number by 2 produces a product which is the same number having all its digits shifted one position to the left.

be zero and all of the other terms in the array containing the term controlling that row must be zero. As an example, on the following binary array of partial products for the number whose square is 1011011001 (radix 2) or 729 (radix 10), there is indicated the additional terms of the array which would be zero because of the zero digits appearing in this specific number:

```
ROW
(controlling                                                        Square
  term)      0 0 0 0 1 0 1 1 0 1 1 0 0 1                            Root 1(a)       1                                                       0

2(b)       0 1                                                     0

3(c)         0 1                                                   0

4(d)            0 1                                                1
                 (1 1 1 0 1 1 0 0 1)
  5(e)             1 0 1                                             1
                 (0 1 0 0 1 1 0 0 1)
  6(f)               1 1 0 1                                         0
                 (1 0 0 1 1 0 0 1)
  7(g)                 1 1 0 1                                       1
                 (0 1 1 0 1 0 1)
  8(h)                   1 1 1 0 1                                   1
                   (0 0 0 0 0 0)

zero because a = 0
  zero because b = 0
  zero because c = 0
  zero because f = 0
```
(15)

Confining the previous array to radix 2 and performing the indicated multiplications by 2 array (12) becomes:

In the Example 15, the number, 1011011001, whose root is desired is entered into a register from which the

```
aa
ab     0  bb
       ac  bc    0  cc
           ad  bd  cd    0  dd
               ae  be  ce  de    0  ee
                   af  bf  cf  df  ef    0  ff
                       ag  bg  cg  dg  eg  fg    0  gg
                           ah  bh  ch  dh  eh  fh  gh  0  hh
```
(13)

Array (13) has been expanded to eight rows, and it is obvious that it can be further expanded to include any number of orders. The square of any number is found by substituting specific bits for the terms of the array and taking the sums in the vertical columns. The lowest or last row of the array is a function of the numbers involving multiples of the least significant radix power, or $2^0$. Furthermore, if any of the bits of the multipliers are zero, then of course, the terms in the array which correspond to such bits are also zero. An additional advantage of the binary system is that the only multipliers permissible are 0 or 1. Accordingly then, if it is assumed that it is desired to find the square of 21 (radix 10) which is equal to 10101 (radix 2), the array (13) can be rewritten as follows:

rows of the matrix are sequentially subtracted. It is obvious that the first three trial subtractions for rows 1, 2 and 3 will result in negative remainders or differences; therefore, the terms $a$, $b$, and $c$ in the root must be zero. Consequently, each term of rows 1, 2 and 3 must be zero, and also each term of the first, second and third slant columns (counting from the left) must be zero since each term contains $a$, $b$, or $c$ as a factor. The fourth subtraction results in a positive remainder indicating that $d$ is 1. The difference for the fourth and each subsequent trial subtraction is enclosed in parentheses. The fifth subtraction also results in a positive remainder, indicating that $e$ is 1. The sixth subtraction, however, results in a negative remainder; therefore, $f$ and all the terms in the

```
        0
        0  0  0
           0  0  0
              0  0  0  0
                 0  0  0  0  1
                    0  0  0  0  0  0
                       0  0  0  1  0  0  1
                          0  0  0  0  0  0  0
                             0  0  1  0  1  0  0
Sum____ 0  0  0  0  0  0  1  1  0  1  1  1  0  0  1 =441
```
(14)

where $h=1$, $g=0$, $f=1$, $e=0$, $d=1$, and $c$, $b$, and $a=0$.

Conversely, it can be seen that, if it is desired to take the square root of a number, then the array of partial products should be sequentially subtracted row by row from that number, beginning with the highest order or first row and ending with the lowest order or last row. If any one of the row subtractions results in a negative remainder or difference, then all terms in that row must sixth row must be zero. Furthermore, all the terms in the sixth slant column (counting from the left) must be zero since each term thereof includes $f$ as a factor. The seventh and eighth subtractions result in a positive remainder and a zero remainder, indicating that both $g$ and $h$ are 1.

Substituting then for the letters $a$, $b$, $c$, $d$, $e$, $f$, $g$ and $h$, there is obtained the radix 2 number 00011011, which is equivalent to the radix 10 number 27 which is the square root of 729.

Figure 1A:
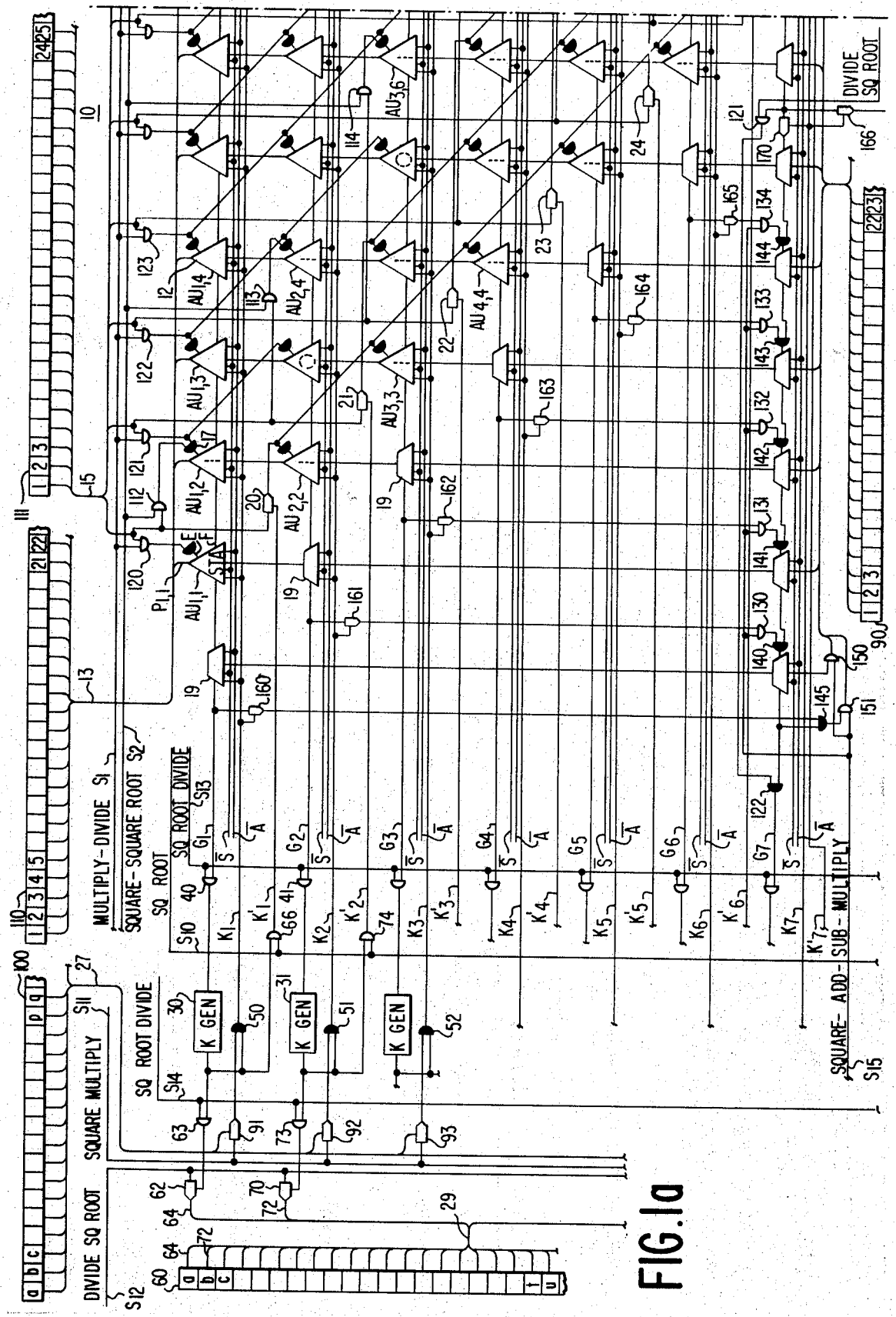
FIGS. 1a and 1b are a schematic diagram of a preferred embodiment of the improved digital calculator showing the matrix of arithmetic units, each with a bypass control, and the various input terminals required for performing the arithmetic operations of square rooting, squaring, division, multiplication, addition, subtraction and conversion between binary and decimal numbers.
Figure 1B:
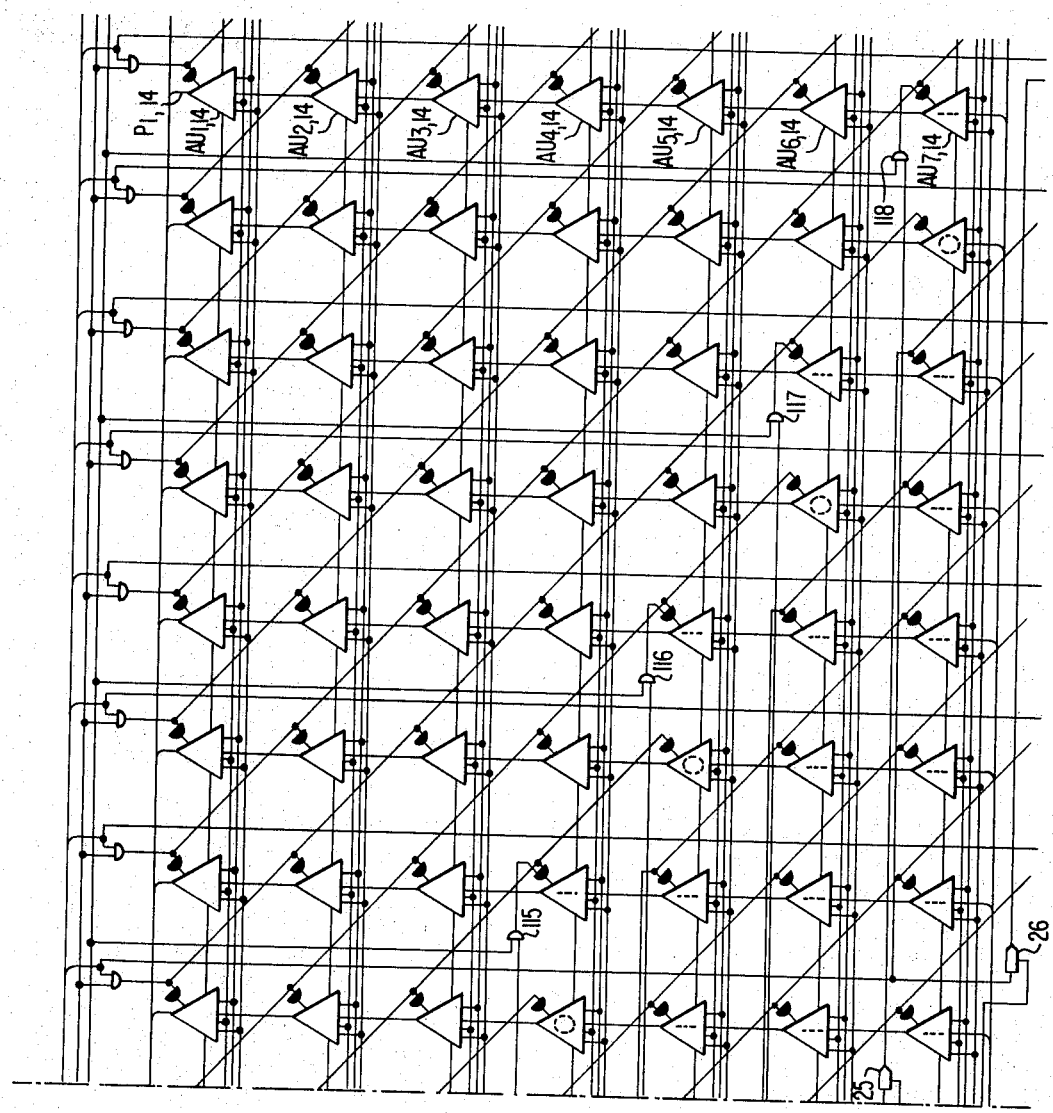

FIGS. 1a and 1b are a schematic diagram of the improved computing complex including the various input terminals required to perform all the arithmetic operations specified above. The complex includes a matrix 10 of a plurality of add-subtract arithmetic units 12 each having a bypass control. The arithmetic unit itself forms no part of the present invention and is fully disclosed and claimed in a copending application entitled "Binary Arithmetic Unit with Bypass Control," filed June 23, 1966, S.N. 563,944, which application is expressly incorporated herein by reference.

The complex including the matrix 10 of arithmetic units 12 is capable of adding or subtracting or of being bypassed and is capable of not only squaring and square rooting, but also adding, subtracting, multiplying, dividing, etc. in an optimum manner without the need for peripheral computing elements. A very important feature of the complex is that it at all times provides an output that is a continuous function of the input number signals and control signals, and any computing or operating time lag is caused only by the inherent time lag of the physical elements utilized since no recycling is required.

Each arithmetic unit 12 is also identified by its row and column position, for example, $AU_{i,j}$ for row $i$, column $j$. The structure and operation of the unique arithmetic unit 12 incorporated in the preferred embodiment of the complex is described in detail in the copending application cited above. However, to aid in the understanding of the present invention, a brief summary of the operation of unit 12 will be presented with reference to the schematic diagram illustrated in FIG. 2a.

The actual circuits of unit 12 need not be disclosed here since they are described in detail and claimed in the copending application. It is sufficient to state that unit 12 is a unique arithmetic unit which utilizes common circuits for both adding and subtracting and also incorporates a novel bypass or K control which permits the P input (augend or minuend) to bypass the unit or to be regenerated at the T output (sum or difference), thereby ignoring either the E input (addend or subtrahend) or the F input (carry-in or borrow-in), or both E and F, but at the same time producing the same G output (carry-out or borrow-out) that would have been generated if the addition or subtraction had actually been performed rather than bypassed. Furthermore, when a suitable control signal is applied to input $\overline{A}$ (not add), the unit will subtract the E input and/or the F input from the P input. When the $\overline{S}$ (not subtract) input is suitably energized, the unit will augment the P input by the amount of the E input and/or the F input. However, as previously explained, when the bypass or K control is energized, the subtraction or addition is ignored and the P input appears unchanged at the T output even though the appropriate carry- or borrow-out signal will appear at the G output. The F input is the borrow- or carry-in from the preceding stage. The half unit 19 lacks the addend/subtrahend E input.

SQUARE ROOT

The complex extracts the square root of a binary number in the following manner. In general, the bits of the number are each applied as signals (such as, a positive voltage for a "1" and a zero or negative voltage for a "0") from some source such as register 110 via a cable 13 to corresponding P inputs of the first row of arithmetic units 12, the lowest order bit being applied to the extreme right input terminal. More specifically, we will assume a thirteen bit number so that the lowest order bit is applied to terminal $P_{1,14}$. The arithmetic unit $AU_{11}$ is not used since a zero is always in the first position of register 110. Consequently, the bits of the number are applied to the first row inputs $$P_{1,2}, P_{1,3}, \ldots P_{1,j} \ldots P_{1,n}$$

The next step is to provide for sequential trial row subtractions in accordance with the array of partial products for squares presented above as array (13). The array of pattern has been indicated on matrix 10 by suitable numerals, 1 or 0 (in dashed lines) placed within the triangles representing the arithmetic units 12. These numerals represent the binary signals which must be applied to the E inputs of the corresponding arithmetic units 12. Binary "1" signals are applied to the correct E terminals from a register 111 which in this case would contain "1's" in all positions. These "1's" are fed via a cable 15 through suppressors 20–26 and through AND gates 112–118 when a square root command appears on line $S_2$ to supply array (13) to matrix 10. For example, a "1" from the first position of register 111 is applied via normally open suppressor gate 20 as a trial subtracter of "1" to the E treminals of the first arithmetic unit 12 in all of the rows except row 1, and also via AND gate 112 and an OR gate 17 as a "1" to the E terminal of $AU_{1,2}$.

The suppressor is also described in detail in the copending application. Briefly, it has an input terminal, an output terminal and a control terminal. When a "1" appears on the input in the absence of a signal on the control terminal, a "1" appears on the output. A signal applied to the control terminal will suppress or block the "1" from the output. A "0" on the input causes "0" to appear on the output whether or not a signal exists on the control input.

In like manner, the "1" in position 2 of register 111 applies a "1" signal to the $E_{2,4}$ input of arithmetic unit $AU_{2,4}$ via AND gate 113 and also via another normally open suppressor gate 21 to the E terminal of the second arithmetic unit in each row except the first two rows. The "1" in position 3 of register 111 applies a "1" via AND gate 114 to the E input of $AU_{3,6}$ and also via a suppressor gate 22 to the E input of the third arithmetic unit in each row except the first three rows. In corresponding fashion, it can be seen that the bits in register 111 are connected through AND gates 112, 113, 114, etc. or corresponding normally open suppressor gates 20, 21, 22, 23, etc. so that the array (13) of partial products is applied to the E inputs of matrix 10.

To start the operation of the matrix for square rooting, an $\overline{A}$ signal is applied to the corresponding $\overline{A}$ inputs of all arithmetic units 12 and 19 to set the matrix in its subtract mode. Furthermore, the borrow-out terminal $G_{1,1}$ of arithmetic unit $AU_{1,1}$ in row 1 and the G terminals of the highest order units in all the other rows are connected to corresponding K signal generators 30, 31, 32, etc., through AND gates 40, 41, 42, etc. The borrow-out signals for the respective rows are indicated as $G_1, G_2, G_3$, etc.

Figure 4:
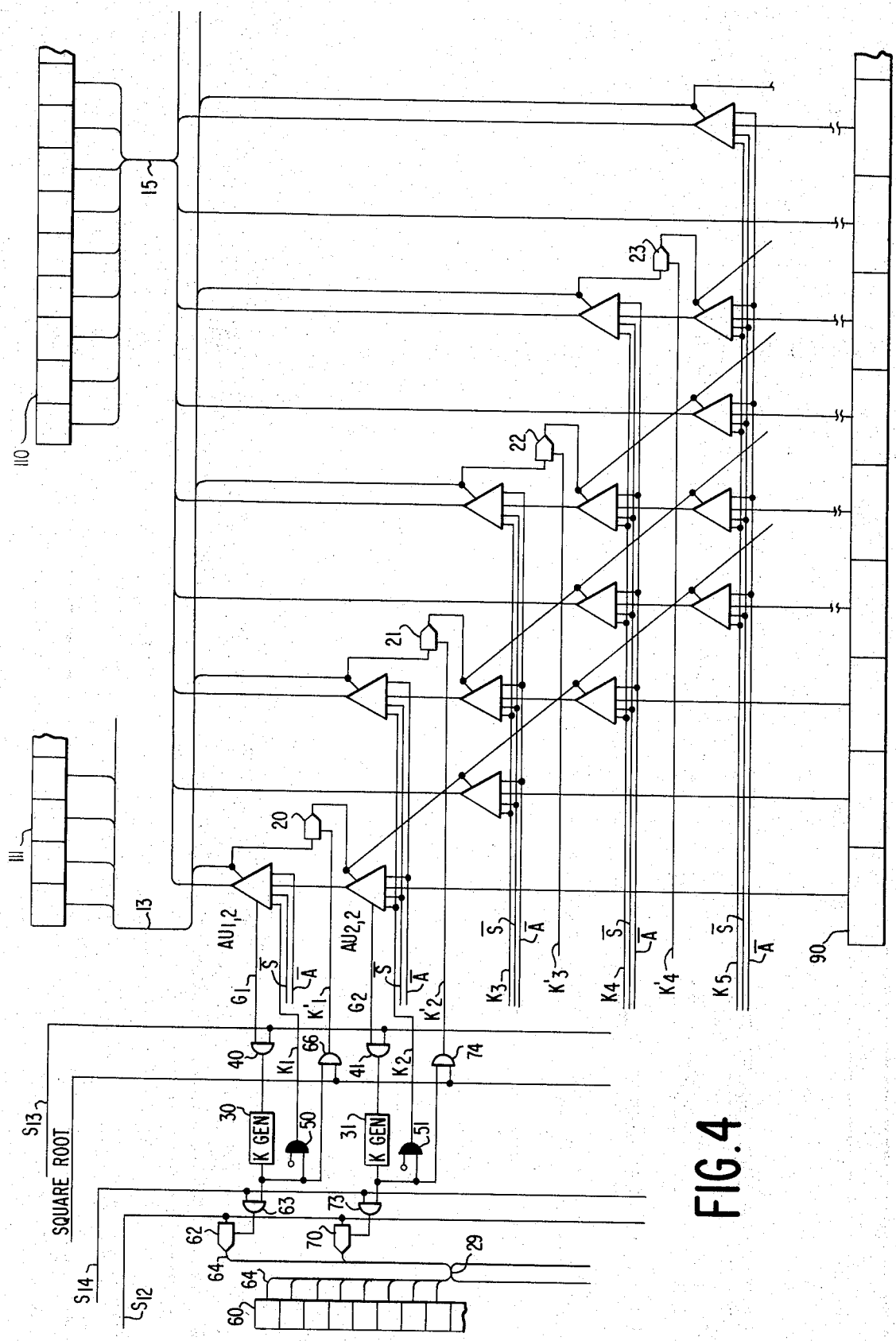
FIG. 4 is a schematic diagram of a portion of the matrix of FIG. 1 showing the interconnections required for a square root computation.

To understand the square root operation let us look now at row 1. The number whose root is to be extracted has been applied to terminals $P_{1,2}, P_{1,3}, P_{1,4} \ldots$ of the corresponding arithmetic units 12 of row 1. Line $S_2$ has been energized to permit application of "1" signals to the E inputs in accordance with array (13). The E inputs not energized correspond to binary "0's." If the subtraction of the binary "1" from the number bit applied to terminal $P_{1,2}$ in $AU_{1,2}$ results in a negative remainder, then a borrow-out signal $G_1$ occurs on the $G_{1,1}$ terminal of $AU_{1,1}$, and is applied through a half unit 19 and AND gate 40 to activate K generator 30. The other input to AND gate 40 for square rooting is the square root control signal. The unsatisfied borrows are here being detected at the G terminals of the half units 19 to the left of the full arithmetic units 12. For "square root only" operations, these half units as well as all arithmetic units not carrying a dashed numeral are not required, as shown in FIG. 4.

Generator 30 generates a bypass or $K_1$ signal in response to the negative remainder or unsatisfied borrow signal $G_1$. When such a negative remainder occurs, it is required that the subtraction be ignored and that the minuend number applied to the P terminals of that row be regenerated directly at the T output terminals of the row. Consequently, a $K_1$ or bypass signal is applied through OR gate 50 to the K terminal of each of the arithmetic units in the first row. The trial subtraction is thereby ignored and the "1" from $AU_{1,2}$ is applied to the $P_{2,2}$ input of $AU_{2,2}$ in the second row to be used as the highest order bits in the minuend for the next trial subtraction. The number bits applied to the other P inputs of the first row are also bypassed to the T outputs to be used as P inputs of the second row.

Furthermore, since the first trial subtraction resulted in a negative remainder, a "0" must occur in the corresponding position of the root or answer. An answer register 60 is provided for reading out the matrix to provide the square root in the form abcdefg from top to bottom in FIG. 1. A "1" signal from control line $S_{12}$ is connected through a normally open suppressor gate 62 to the highest order position of the answer register. If the first row trial subtraction results in a positive remainder, than a "1" is transferred via line 64 to the highest order $a$ position in the register. However, when the trial subtraction produces a K or bypass signal, then gate 62 is closed since, as shown in FIG. 1, the $K_1$ signal is also applied through an AND gate 63 to the control input of suppressor gate 62. Consequently, a "0" appears in the highest order position of register 60. The other input to AND gate 63 is the SQUARE ROOT or DIVIDE command signal.

Furthermore, in accordance with the previous discussion and as illustrated by problem (15), when the subtraction of a row of the matrix results in an unsatisfied borrow and consequently a zero in the corresponding position of the answer, then each arithmetic unit 12 in the slant column of the matrix corresponding to the controlling term in the bypassed row must also have a "0" applied to its E terminal in spite of the predetermined pattern of "1"'s and "0"'s shown in array (13). To accomplish this change when row 1 is bypassed, for example, the output of K generator 30 is fed to AND gate 66. When a square root operation is being performed, the other input of AND gate 66 is energized by an appropriate SQ ROOT signal to produce on the output of the AND gate a $K'_1$ signal which is then applied to the control input of suppressor gate 20 to close the gate and suppress or block the "1" signal applied to E inputs of the arithmetic units below and to the right of suppressor gate 20. More specifically, in addition to $AU_{1,2}$ being bypassed by action of the $K_1$ signal, the arithmetic units $AU_{2,2}$; $AU_{3,3}$; $AU_{4,4}$, etc. are also, by action of the $K'$ signal, made ineffective.

The remaining rows operate in similar fashion. For example, for the trial subtraction of row 2, the binary bits 101 are converted by the above discussed action of suppressor 20 to 001 and are subtracted from the minuend appearing on the P terminals of $AU_{2,2}$; $AU_{2,3}$; $AU_{2,4}$, etc. If the remainder is positive, a "1" is applied via a normally open suppressor gate 70 and a line 72 to the second highest order position in answer register 60. However, if a negative remainder occurs, then a borrowout signal $G_2$ appears on the $G_{2,2}$ terminal of $AU_{2,2}$ and is applied via a half unit 19 and AND gate 41 to activate K generator 31. The resulting $K_2$ signal is applied via OR gate 51 to all the K terminals of the arithmetic units in row 2, whereby bypassing their P inputs to their T outputs. The $K_2$ signal is also applied through an AND gate 73 to the control input of suppressor gate 70 causing a "0" to appear in the second highest position of answer register 60. Furthermore, the $K_2$ signal is also applied to an AND gate 74 whose other input is a SQ ROOT signal from line $S_{10}$. The output of AND gate 74 is a $K'_2$ signal which is applied to the control input of suppressor gate 21, thereby blocking or suppressing the "1" signal applied to line $S_3$ from position 3 of register 111 and causing a "0" to be applied to the E inputs of all arithmetic units in the slant column driven by line $S_3$, i.e. $AU_{3,4}$; $AU_{4,5}$; $AU_{5,6}$ . . .

As a result, the square root of the number applied to the P terminals of the first row appears in answer register 60. Furthermore, the matrix is continuously responsive to change in the number applied to these P terminals, and no recycling occurs as required in prior calculators.

The remaining rows all have the same combinations of K generators, OR gates, AND gates, etc., so that they function identically to rows 1 and 2. However, for the sake of clarity, all of these logical elements have not been shown in FIGS. 1a and 1b.

FIG. 4 is an enlarged view of a portion of FIGS. 1a and 1b showing the inputs and logic elements used specifically for the square rooting operation. The number whose individual stages are connected to the corresponding P inputs of the arithmetic units in the first row of the matrix. The difference between the square of the answer and the given number (in register 110) appears in the remainder register 90.

Figure 6:
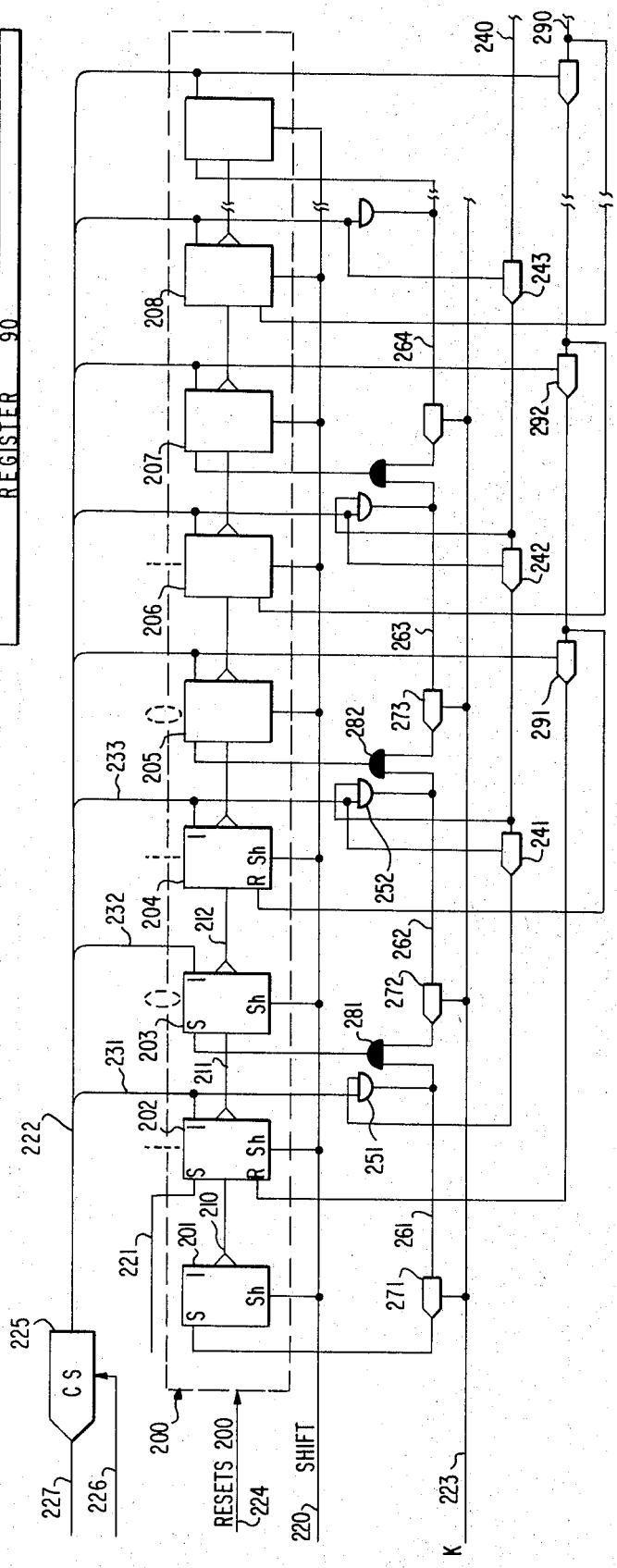
FIG. 6 is a schematic diagram of a means for generating the square/square root array of partial sums or partial subtractions.

The array (13) is useful for finding square roots of numbers as just described and also for finding squares of numbers as described below. These two cases portray the use of the array wherein the various trial subtractors or trial sums would be stored and modified in some memory matrix and moved in their entirety into the calculating matrix which is the novel device forming the principal part of this invention. As is elsewhere described, the array can be used in serial and block-serial computers. It is true that many of these computers use the serial or block-serial technique because the expense of a large calculating array is not warranted. Similarly, the expense of a large memory to hold the numeric pattern of array (13) may not be warranted. That the array (13) can also be generated in serial or block-serial fashion by means of cumbersome "brute force" techniques is apparent. However, the above discussion and FIG. 6 show a much more efficient means by which the array can be generated and modified in accordance with K signals.

Referring to display 15a below, it can be seen that the encircled binary numbers in the first, fourth, seventh, etc. lines constitute the terms of the array in Example 15 before that array was modified to show the example of problem solving.

```
     ①                            1st "1"
     1 1

1 0 1                        Combined (C)
    (1 0 1)                       Shifted (S)
     1 1

-1 1 0 1                      Combined (C)
    (1 1 0 1)                     Shifted (S)
       1 1
                                              (15a)
     1 1 1 0 1                    (C)
    (1 1 1 0 1)                   (S)
         1 1

1 1 1 1 0 1                  (C)
    (1 1 1 1 0 1)                 (S)
           1 1

1·1 1 1 1 0 1                 (C)
    (1 1 1 1 1 0 1)               (S)
             1 1

1 1 1 1 1 1 0 1               (C)
    (1 1 1 1 1 1 0 1)             (S)
               1 1

'1 1 1 1 1 1 1 0 1             (C)
    (1 1 1 1 1 1 1 0 1)           (S)
```

Examination of (15a) will show that it was constructed by starting with a high order binary, a "1," then adding to that bit two adjacent binary bits with the lowest order of these two bits in the same order as the starting bit. This is performed as addition with the exception that the carry is transmitted not to the left but to the right, thus:

$$\begin{array}{r} 1 \\ 11 \\ \hline 101 \end{array} \qquad (15b)$$

Then the answer so obtained is shifted one position to the right, thereby obtaining the second trial subtractor of the array (15) in the proper position. The trial subtractors thus obtained are sequentially subtracted from the number whose root is to be taken in the same manner as previously described. If the trial subtraction produces a negative remainder resulting in the K signal being generated, then that subtraction is bypassed in the arithmetic unit and the next trial subtractor of the array is generated. However, this operation is modified because of the K signal which causes the left hand or higher order "1" of the addend in Example 15b to be converted to a "0." When this is done, the addition is made as before with the carry moving to the right. The answer from that combining operation is then shifted once to the right and again used as a trial subtractor. This modified operation is shown in array (15c) wherein the array is generated and modified in accordance with the problem of array 15. The identity of the two modified resultant arrays is obvious.

passes along line 231 through cable 222, a cable suppressor 225, and a cable 227 to the corresponding arithmetic unit and serves as the first trial substractor in the square root solution. Cable suppressor (CS) 225 represents a plurality of individual suppressors on lines 231, 232, 233 . . . , the suppressors having a common control input 226, as illustrated in FIG. 3. If the trial subtraction results in a positive answer, then there will be no K signal appearing on bus 223. A command signal is next impressed on line 240 as a "1" passing through suppressors 241, 242, 243, . . . to one input of AND gate 251. This signal would pass through these suppressors. The suppressor control inputs are connected to flip-flops 204, 206, 208, . . . which are in their "0" state. The other input to AND gate 251 is the "1" signal present on the output of flip-flop 202. A "1" signal appears on the output of gate 251 and is impressed on line 261. This "1" passes to the left through suppressor 271 which is open because of the absence of a K signal and thence to the set input of flip-flop 201 causing a "1" to appear in that flip-flop. The "1" signal output from AND gate 251 also travels to the right through OR gate 281 and then to the set input of flip-flop 203 causing a "1" to appear in that flip-flop.

The next command signal consists of a "1" signal on line 290 which progresses through open suppressors 291, 292, . . . and then to the reset input of flip-flop 202 which switches to its "0" or reset state. While passing along line 290, this reset impulse is also applied to the reset inputs of flip-flops 204, 206, 208, . . . , but since (15c)

| | | | | | | | | | | |
|---|---|---|---|---|---|---|---|---|---|---|
| Negative remainder (NR), so | 0 | 1 1 | | | | | | | | |
| NR, so | | 0 0 1 0 0 1 0 1 | | | | | | | | |
| NR, so | | 0 0 0 1 0 0 0 1 0 1 | | | | | | | | C S |
| Positive remainder (PR), so | | 0 0 0 0 0 1 0 0 0 0 0 1 1 1 | | | | | | | | C S |
| PR, so | | 1 0 1 1 0 1 1 1 | | | | | | | | C S |
| NR, so | | 1 1 0 1 1 1 0 1 0 1 | | | | | | | | C S |
| PR, so | | 1 1 0 0 1 1 1 0 0 1 1 1 | | | | | | | | C S |
| | | 1 1 0 1 0 1 1 1 0 1 0 1 | | | | | | | | C S |

Note.—Combined (C); Shifted (S).

Referring now to FIG. 6, there is shown a novel method of generating this array for any square root problem. The mechanism shown consists of a series of AND and OR gates and suppressors connected to a shift register 200 consisting of the individual flip-flops 201, 202, 203 . . . . Since shift registers are well known in the art, their mechanism is not displayed here other than as is pertinent to the generating technique to be described. The well known conditioning and delay circuits necessary to shift register operation are merely symbolized by the mechanism 210, 211, 212, . . . , and the shift bus 220 connected to each of the flip-flops, when pulsed, is considered to cause the data present in shift register 200 to shift without change one position to the right. This operation is conventional and will not be described.

Upon the generation of a SQUARE ROOT command, a "1" pulse is applied through line 221 to the set input of flip-flop 202, placing the flip-flop in the set or "1" state. Therefore, a "1" signal is placed on line 231. This "1"

these flip-flops are already at "0," no switching takes place.

The next command is a shift command on bus 220 which causes the 101 now present in flip-flops 201, 202 and 203, respectively, to shift one position to the right and appear in flip-flops 202, 203 and 204. These signals are then transmitted through lines 231, 232 and 233 into cable 222 where they are impressed on the proper inputs to the calculating assembly and there are used to perform the second trial subtraction.

In the event that a trial subtraction causes an unsatisfied borrow and a subsequent K signal, the K signal will appear on line 223 and close all suppressors 271, 272, 273, . . . . Since this K signal occurs before the command signal and continues through the command signal period, it will act through suppressor 271 to prevent the "1" appearing on the output of AND gate 251 from setting a "1" in flip-flop 201. This is equivalent to converting the left hand or highest order "1" of the "11" pair to a "0"

as illustrated in array 15c. As a consequence of this action, instead of a "111" signal in flip-flops 201, 202, and 203, there will be the number 011. After the second command pulse is applied to line 290 and resets flip-flop 202 as described earlier, the number 001 will be in flip-flops 201, 202 and 203. This number is then shifted one position to the right by the shift pulse and appears finally in flip-flops 202, 203 and 204.

After the second trial subtraction is performed, the sequence of commands just recited is repeated. The first command impulse is impressed on line 240; however, this impulse, because of the "1" present on the output of flip-flop 204, is suppressed by suppressor 241 and does not reach AND gate 251. Instead, it appears as one input to AND gate 252 and is coupled there with the "1" output of flip-flop 204 and appears as a "1" on line 262 where it proceeds to the left through suppressor 272 if there is no K signal present, thence through OR gate 281 to the set input of flip-flop 203. In addition, it goes to the right on line 262 through an OR gate 282 to the set input of flip-flop 205.

The second command signal appears on line 290, progresses as before to the left, but this time is stopped by suppressor 291 closed by the action of the "1" signal on the output of flip-flop 205, and therefore the command signal does not reach the reset input of flip-flop 202. Instead, it passes to the reset input of flip-flop 204, resetting that flip-flop to "0."

Again, as before, the third command signal is a shift pulse on bus 220 which causes the pattern of signals now present in flip-flops 202, 203, 204 and 205 to shift one position to the right into flip-flops 203, 204, 205 and 206.

The process continues in this fashion until array (13) or (15) has generated as far as desired or the number of elements permits. It is also true that the array will be modified in accordance with permitted trial subtractions to meet the requirements of square root generation.

Figure 7A:
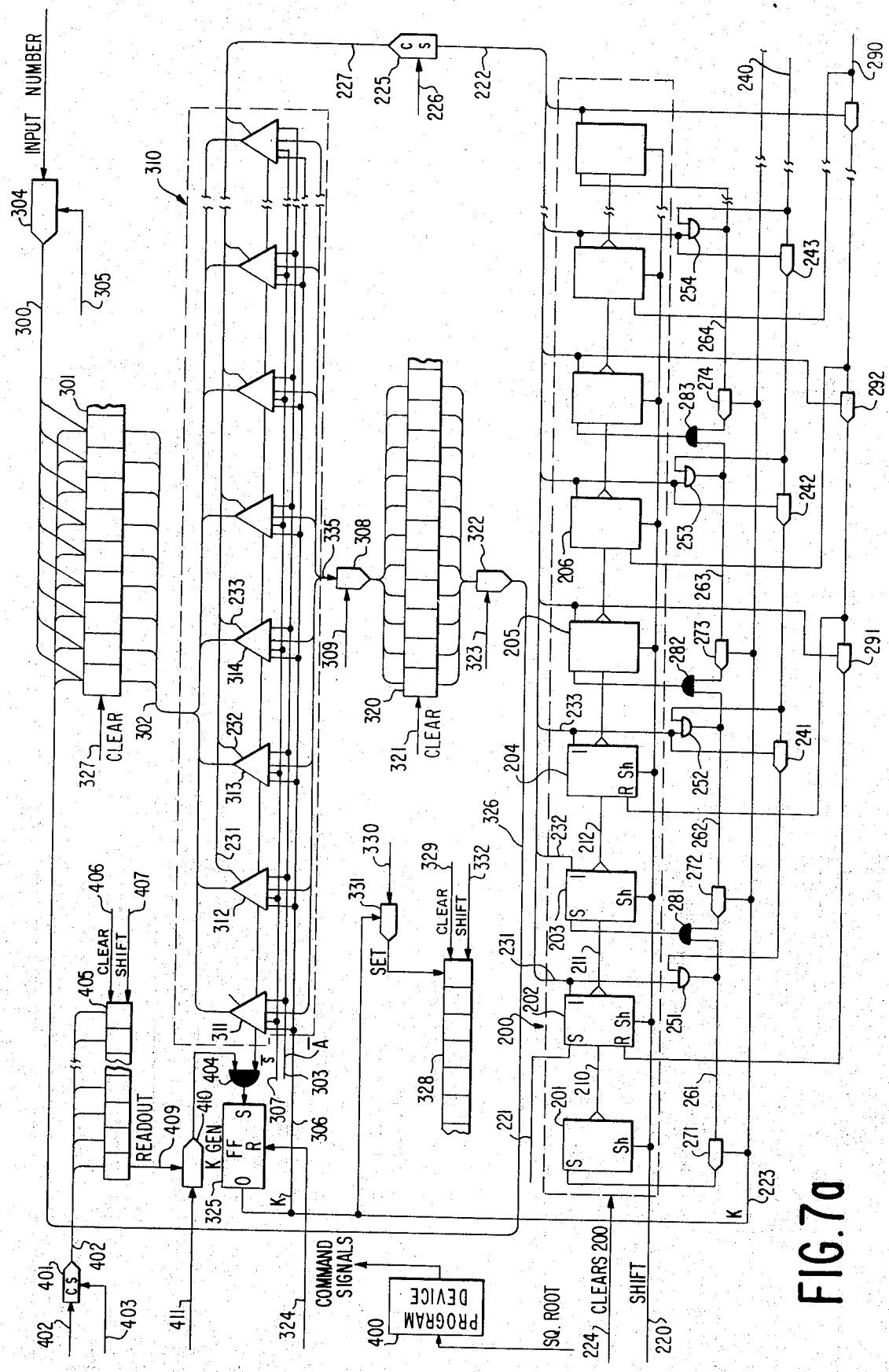
FIG. 7a is an illustration of the incorporation of the device of FIG. 6 into a block-serial calculator.

In FIG. 7a, the array generating means of FIG. 6 is shown as part of a block-serial calculator. Identical elements in FIGS. 6 and 7a carry the same reference numerals.

In FIG. 7a, the block-serial calculator is shown to consist of an array of full arithmetic units 311, 312, 313, . . . as combined with registers 301, 320, 328 and K generator 325. In a block-serial calculator, continuous control in terms of an input number is, by definition, impossible so that K generator 325 can in this case be a flip-flop. That generator 325 be a flip-flop is not required, but it offers some convenience where continuous control is of no importance. The sequence of events can best be understood by examining FIG. 7a in conjunction with FIG. 7b which is a timing chart of the operation to be performed. As will be noted from FIG. 7b, a first command signal is the SQUARE ROOT command applied to some such controller as the program device 400 which in turn supplies command signals to the calculator. On direction to perform square root, the program device first applies to line 303 an $\bar{A}$ signal which lasts throughout the entire square root operation. The program device then immediately supplies a "clear" impulse to all registers via lines 327, 324, 321, 329 and 224. It next supplies a "1" impulse to line 221. This impulse, as earlier described, sets a "1" in flip-flop 202 of the shift register 200 in the trial subtractor array generator. It next opens cable suppressor 304 by suppressing a "1" normally present on line 305, thereby permitting the input number whose square root is to be obtained to pass from some external source via cable 300 and be set in the various stages of register 301. The number so set in register 301 appears on the output of register 301 and via cable 302 is impressed on the P inputs of arithmetic units 311, 312, 313, . . . The next command signal is a suppression of the "1" normally on line 226 connected to the control input of cable suppressor 225, thereby opening the suppressor 225 and permitting the signal stored in shift register 200 to pass via cables 222 and 227 to the E inputs of arithmetic units 311, 312, 313 . . . While cable suppressor 225 is open, the difference between the number impressed on the P inputs of assembly 310 and the number impressed on the E inputs will appear on the T outputs and, accordingly, be impressed on the various signal paths of cable 335. While suppressor 225 is still open, the program device suppresses the "1" normally present on line 309, permitting the difference signal just obtained to pass through cable suppressor 308 to enter the set inputs of the various flip-flops comprising register 320. When this is accomplished, the program device allows cable suppressors 308 and 225 to close. The difference signal is now stored in register 320. Of course, if a K signal were generated, the trial subtractor would be bypassed in the manner described earlier, and the number originally stored in register 301 would appear in register 320.

The next command generated by the program device is one that clears register 301 by applying an impulse to line 327. Then a cable suppressor 322 is opened by suppression of the "1" normally present on line 323, and the number stored in register 320 is transmitted via cable 326 to the set entries of the flip-flops of register 301 and accordingly, that number is now stored in register 301.

Simultaneously, with the application of a "clear" signal to register 301, a "1" signal is impressed on line 330 by the program device. If no K signal is generated, this "1" is transmitted through suppressor 331 and sets the lowest order position of the answer register 328, which is a conventional shift register. Next, simultaneously with the opening of cable suppressor 322, a shift pulse is applied from the program device to the shift bus of register 328, causing the number stored in that register to be shifted one place to the left.

Figure 7B:
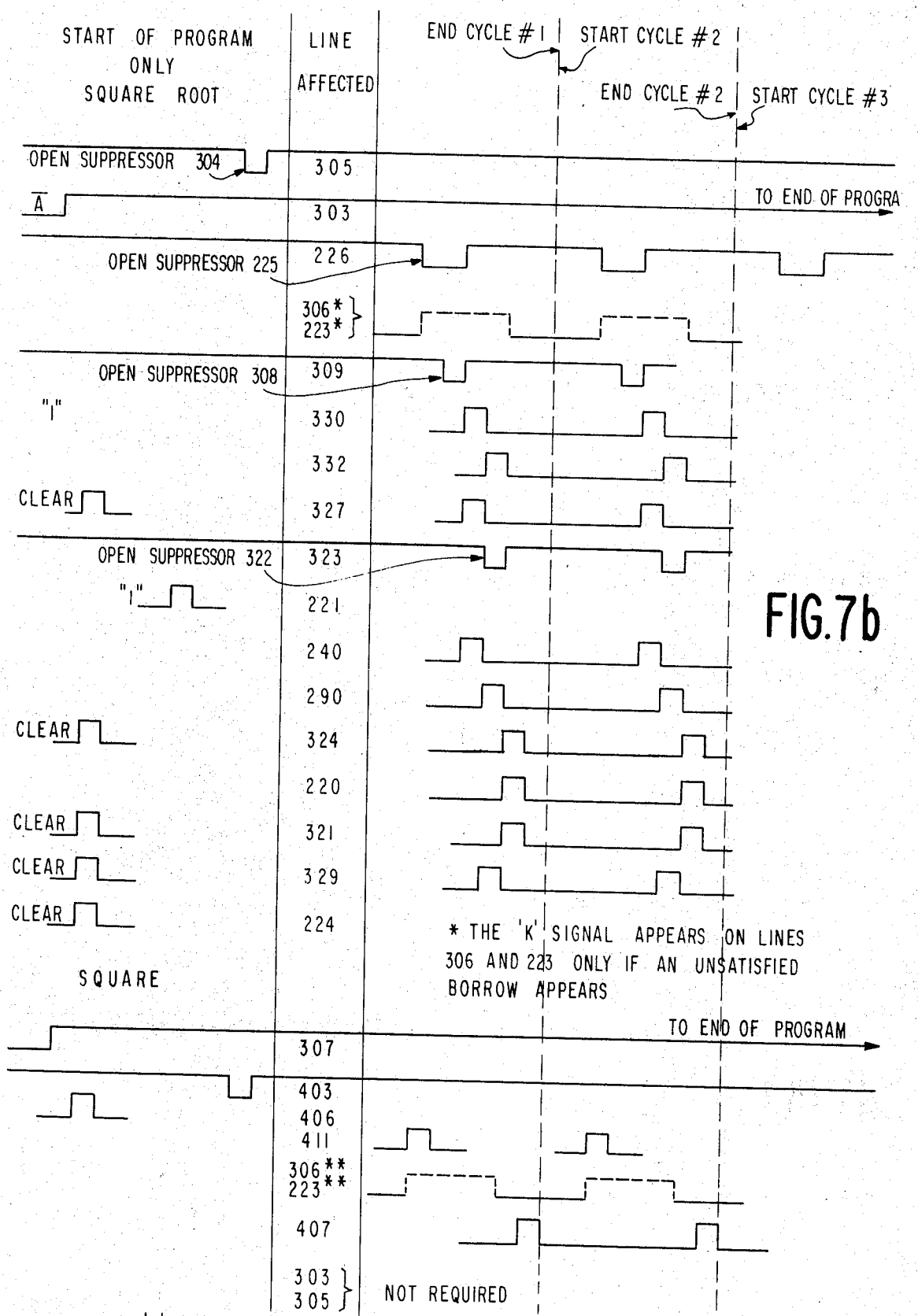

Concurrently with these command signals to the calculator, the program device is, in proper sequence, and, as illustrated by the chart of FIG. 7b, delivering the previously described control signals to lines 240, 290 and 220 of the array generator.

Finally, device 400 produces the appropriate signals to clear register 320 via line 321 and to reset K generator 325 via line 324. This completes the first trial subtraction or cycle. At this time, the number stored in register 301 is the originally applied input number if a K signal was generated, or is the difference between the originally applied input number and the first trial subtractor if no K signal was generated. In addition, instead of the first trial subtractor in the form of a "1" in flip-flop 202, the shift register 200 of the array generator now contains the second trial subtractor in the form of either a "001" in flip-flops 202, 203 and 204 if a K signal was generated or else a "101" in flip-flops 202, 203 and 204 if no K signal was generated.

The program device then begins the second cycle by opening cable suppressor 225 and performing the second trial subtraction. The process of shifting and transferring repeats as for the first cycle. This process is repeated as long as desired or until the limit of the registers is reached. At the completion of the operation, it will be seen that the largest whole number square in the input number will be stored as an answer number in register 328 and the difference between the answer number squared and the input number will be stored in register 301. It will be obvious to those skilled in the art that the specific mechanism of the block-serial calculator and the array generator is limited only by the ingenuity of the designer; however, the preferred embodiment just described adequately discloses a specific means for the generation, modification and manipulation of the array (13) for either block-serial calculations or for storage in memory for future use.

SQUARING

For the generation of squares, referring again to FIGS. 1a and 1b, the number to be squared is inserted simultaneously in registers 111 and 100. Register 111 acts in the same way as for the square root operation to allow the same array (13) of partial products to all E inputs of the matrix. On the other hand, the outputs of register 100 are fed through cable 27 to the control inputs of suppressors 91, 92, 93, etc. The signal inputs of these suppressors are "1"s supplied by a SQUARE command on line $S_{11}$. These "1"s pass through the suppressors which are not closed by control signals from register 100 and pass through OR gates 50, 51, 52, etc. where they are applied as K signals to the K inputs of the rows of the matrix 10 corresponding to the zero bits in the number to be squared. By this action the pattern or array (13) applied by register 111 is modified to produce the partial sums or products pertinent to the square of the actual input number. Array (14) above is an example of such a modified array. When the matrix is instructed to add by the energization of the $\bar{S}$ inputs of all the arithmetic units in the matrix, the rows of the matrix are added, and the square of the applied number appears in the answer register 90. The answer register 60 is inoperative for a squaring computation.

It is apparent that several different techniques could be followed to produce squares of numbers. For example, in a matrix to perform only square operations, the register 100 would not be required and cable 27 would be connected in parallel with cable 15 to the output of register 111.

In addition, it would be possible to apply the number to be squared to both registers 100 and 111 but also allow register 111 to operate through AND gates 120, 121, 122, etc. As will be described later, such operation is multiplying a number by itself and, of course, it will produce the square of the number in register 90. However, the previously described squaring operation is preferred since it takes maximum advantage of one of the novel aspects of the invention in that it eliminates or bypasses many of the longest wave paths of the matrix permitting squares and square roots to be calculated in significantly less time than equivalent multiplications or divisions.

It should also be noted here that simultaneous application of a number A through register 110 and a number B through registers 111 and 100 with a SQUARE command results in the mathematical operation $A+B^2$ being performed.

Figure 8:
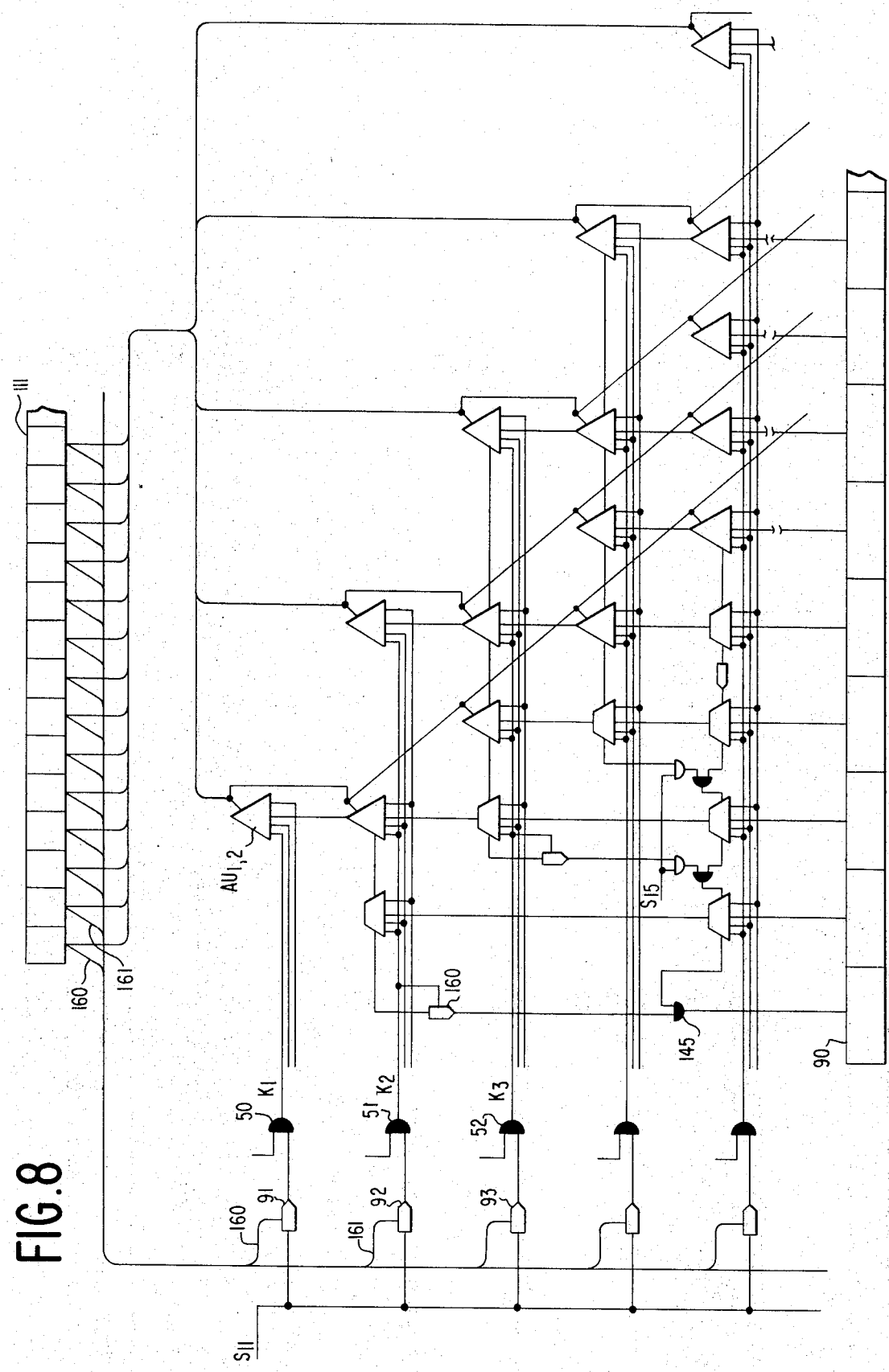
FIG. 8 is a schematic diagram illustrating the matrix interconnections required for a squaring operation.

FIG. 8 is an enlarged view of a portion of FIGS. 1a and 1b showing the inputs and logic elements used specifically for the squaring operation.

In serial or block-serial applications, the circuit of FIG. 6 can be used to generate the array (13) for use in squaring by merely starting the operation with a "1" signal applied to wire 221 and allowing the process to proceed as in square root with the exception that the K signals are here generated in acordance with the presence or absence of a "1" in the appropriate position of the number to be squared. This is determined by allowing the number to be squared to shift serially across a read out point in a shift register in the same relative position as the shift steps are applied to register 200. This is shown in FIG. 7a where it is indicated that all that is necessary to convert the calculator from a square rooting only operation to both squaring and square rooting operation is to add a shift register 405, a cable suppressor 401, a suppressor 410 and an OR gate 404. In the process of squaring, all registers are first cleared, then the number to be squared is read into register 405 in parallel via cable 402 and through cable suppressor 401 which would be opened for that purpose. In addition, a "not subtract" signal $\bar{S}$ is applied to line 307. Register 301 is left empty. Then, a test pulse is applied to line 411 and, if there is no "1" in the read out position of register 405, it is passed through suppressor 410 and OR gate 404 to set the K generator 325. The operation is then exactly the same as for square rooting in that the number in register 200 is combined with an "01" pair instead of with an "11" pair and shifted, and register 320 would contain nothing.

If, on the other hand, there is a "1" at the read out point of register 405, then there is no K pulse, and the number in register 200 is combined with an "11" pair and shifted. The contents, before combination, of register 200 are added in the arithmetic units to the contents of register 301, and the sum is inserted in register 320 and then shifted to register 301 for the next step. The next step is preceded by a shift pulse on line 407 causing the second most significant bit in the number to be squared to be moved to the read out position. It is apparent that register 328 could be so switched as to perform the function described for register 405. This technique is straight forward and not germane to the novelty of this invention. As portrayed however, it will be noted that at the completion of the squaring operation, the number to be squared would be stored in register 328. The sequence of pulses for squaring is the same as that for square rooting except for those controls applied to lines 307, 403, 406, 411 and 407, as shown in the timing chart of FIG. 7b.

DIVISION

For division, the matrix operates by using trial divisors as trial subtrahends. Such a technique is well known to mathematicians. However, conventionally to divide 375 by 25, the following approach is used:

$$25 {\overline{\smash{\big)}\,375\phantom{)}}} \begin{array}{r} 15 \\ \phantom{)}\underline{25\phantom{0}} \\ 125 \\ \underline{125} \\ 0 \end{array} \qquad (16)$$

Eliminating the convention, the problem takes the following form:

$$25 {\overline{\smash{\big)}\,375}}$$

| | |
|---|---|
| 250 | Try 10 × 25 and subtract. |
| 125 | Difference positive so bypass and try 20 × 25 and subtract. |
| 375 | |
| 500 | (17) |
| -99875 | Difference negative so bypass and try 11 × 25 and subtract. |
| 375 | |
| 275 | |
| 100 | Difference positive so bypass and try 12 × 25 and subtract |
| | and so on. |

Even this approach makes use of such customs as mentally estimating the length or magnitude of the dividend so as to arrive at the first trial quotient (10 in the above example).

The problem is simplified with respect to binary operations as follows:

```
              1111
   11001 /101110111
           11001
           -----
           101011
            11001
            -----
            100101
             11001
             -----
             11001       (18)
             11001
             -----
                 0
```

To further relate the mathematical techniques to the operation of matrix 10, it is helpful to restate the same problem as follows:

```
      11001 /101110111

110010000    Try 10000 x 11001 and
                          subtract.
           -111111100111  Diff. negative; bypass
                          and try
             101110111    1000 x 11001.
1000         11001000
             ---------
             10101111     Diff. positive; try
                          100 x 11001.
 100          1100100
              --------
              1001011     Diff. positive; try
                          10 x 11001.
  10·          110010
               -------
                11001     Diff. positive; try
                          1 x 11001.
   1           11001
               -----
1111 Ans.          0
```

The operation of the matrix 10 for division is quite similar to square rooting. The individual bits of a dividend number from some device such as register 110 are applied via cable 13 to the corresponding P terminals of the arithmetic units 12 in the first row of the matrix 10. The binary bits of the divisor appearing in register 111 are applied through cable 15, via AND gates 120, 121, 122, 123, etc. and via suppressors 20, 21, 22, etc. to the E inputs of respective slant columns of the matrix 10 with the highest order bit of the divisor applied to the slant column farthest to the left. The second inputs to AND gates 120, 121, 122, etc. are supplied with "1's" from the DIVIDE control signal on line $S_1$. The suppressors 20, 21, 22, etc. are all open since the SQUARE ROOT signal is not applied to line $S_{10}$. In this manner, the divisor is applied to all the rows of the matrix. Furthermore, a "not add" signal $\overline{A}$ is applied to the appropriate terminals of all of the arithmetic units to set the matrix in its subtract mode. The SQUARE ROOT signal and consequently the K' signal does not appear in division operation. The K signal however is used. When an unsatisfied borrow occurs from the highest order unit of any row, the K signal causes the subtrahend in that row to be bypassed and applies a zero to the corresponding stage in the answer register 60 in the same manner described in connection with the square root operation. The remainder appears in register 90.

FIG. 9 is an enlarged view of a portion of FIGS. 1a and 1b showing the inputs and logic elements used specifically for division.

MULTIPLICATION

As mentioned earlier, the slant right matrix of the invention is an improvement over prior computing matrices in that the number of matrix units required for performing all arithmetical computations is reduced. It is a key aspect of this invention that multiplication be performed thereby in an unconventional manner.

Conventionally, if it is desired to multiply binary 25 (11001) by 13 (1101), the following steps are followed:

```
                Multiply 25 x 13

25 =           11001
      x  13 =            1101
                       -------
                        11001
                        00000
                       11001
                      11001
                      ----------
        325          101000101
```

However, it is also important to recognize that the same multiplication may be performed as follows:

```
              1 1 0 0 1
                1 1 0 1
              ---------
            1 1 0 0 1
            1 1 0 0 1
            0 0 0 0 0
            1 1 0 0 1              (21)
            ---------
          1 0 1 0 0 0 1 0 1
```

Comparison of the above array with the slant left to right array (18) used above for division shows that the two arrays are identical and that only the mathematical operations, subtract for division and add for multiplication, are different.

Matrix 10 may also be used for multiplication. In this case, the multiplicand bits in register 111 are applied to E inputs of the slant rows of matrix 10 via cable 15, AND gates 120, 121, 122, etc. and suppressors 20, 21, 22, etc. in the same manner in which the divisor is applied thereto for division. The bits of the multiplier from some such device as register 100 are applied via cable 27 to the control inputs of suppressors 91, 92, 93, etc. The suppressors connected to corresponding bit positions of the multiplier containing "1's" will close while those suppressors connected to bit positions of the multiplier containing "0's" will remain open. Consequently, when a multiply command in the form of a "1" signal is applied to $S_{11}$, a K signal will propagate through the open suppressors 91, 92, 93, etc. to the horizontal rows of the matrix 10 in accordance with the "0's" in the multiplier. Accordingly the slant columns of the matrix will contain "0's" or "1's" in accordance with the "0's" or "1's" in the multiplicand. Through the action of the K signals, the horizontal rows of the matrix will contain "1's" or effectively "0's" in accordance with the "1's" or "0's" in the multiplier. A typical condition of the matrix is shown in Example 21 above.

Finally, when the matrix 10 is set in the ADD mode by application of the proper $\bar{S}$ command to the $\bar{S}$ terminals of the arithmetic units, the product of the multiplier and multiplicand will appear in register 90.

FIG. 10 is an enlarged view of a portion of FIG. 1 showing the inputs and logic elements used specifically for multiplication. It is apparent also that if a signal A is applied through register 110 to the $P_{1,j}$ terminals, a signal B to register 111, and a signal C to register 100, then the operation $A+(B\times C)$ is performed in the multiply mode.

Figure 5:
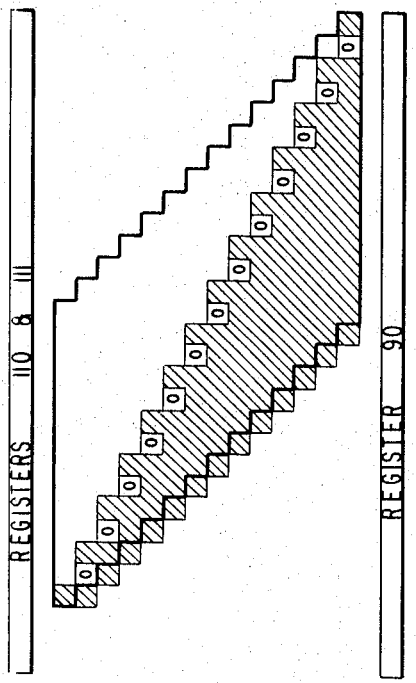
FIG. 5 is an overlay of the arithmetic units required for "square root-only" on the general matrix of FIGS. 1a and 1b.

The area between the heavy lines of the overlay of FIG. 5 represents the matrix elements required for multiplication and division.

ADDITION

The matrix 10 performs addition when an augend is applied to the P terminals of the first row of arithmetic units and an addend to the corresponding E terminals of a different row of the units. The "not subtract" $\bar{S}$ inputs are energized to place the matrix in the ADD mode.

SUBTRACTION

Similarly, for simple subtraction, the minuend is applied to the P terminals of the first row, and the subtrahends are applied to the corresponding E terminals of the rows. In this case, the "not add" $\bar{A}$ terminal is energized to place the matrix in the SUBTRACT mode.

By suitable energizing the $\bar{A}$ and $\bar{S}$ inputs, it is seen that a combination of ADD and SUBTRACT operations can be performed simultaneously on the matrix.

CONVERSION BETWEEN BINARY AND BINARY CODED DECIMAL NUMBERS

Matrix 10 may also be used for converting from binary to binary coded decimal numbers and from binary coded decimal to binary numbers.

Two of the other applications of the array come readily to mind; these include conversion from a 1-2-4-8 code or binary coded decimal (BCD) to straight binary and the inverse conversion from straight binary to the BCD code.

The techniques for conversion from decimal (radix 10) numbers to binary (radix 12) numbers via a BCD code are well known in the art. In the process, a decimal number is first divided in terms of its 10's positions, thus 397=300+90+7; and, secondly, these 10's values are expressed as sums of 1, 2, 4 or 8; or 10, 20, 40 or 80; etc., as appropriate. These final values are thirdly expressed as sums of the binary equivalents and combined through addition in such devices as serial, block-serial, or parallel adders. The procedure may be indicated schematically as:

Convert 397 to binary via 1-2-4-8

```
                    1-2-4-8
                     code      Binary
           ┌  200 =   11001000
     ┌300 =┤
     │     └  100 =   1100100
     │
397 =┤    ┌  80  =   1010000
     │ 90=┤
     │    └  10  =   1010
     │
     │    ┌  4   =   100
     └  7=┤  2   =   10
          └  1   =   1

397 =               110001101
```

Conventionally, the first operation is performed on the input keyboard of the machine; the second is performed by a simple and well-known diode matrix connected to that keyboard; and the third, since all operations are additions, in an add matrix or system.

While the conversion from decimal numbers to binary numbers is straightforward, as described, the inverse operation is much more difficult. This is because high order binary numbers involve low order decimal partial sums to a much greater extent than in the converse case. In the prior art, however, many logic gate arrangements have been developed for converting from BCD to decimal numbers, but even these tend to be complex and cumbersome in operation.

Another novel feature of this invention is the capability of the complex including matrix 10 to perform the conversion from binary to decimal in a straightforward and logical manner. All that is necessary is to apply the bits of the binary number to be converted to the corresponding P terminals in the first row of matrix 10 in FIGS. 1a and 1b, and then apply to the various E terminals, row by row beginning with the highest value possible in the matrix, the binary equivalents of the decimal partial sums of the largest possible number, these decimal partial sums being expressed in BCD code. (Other intermediate codes or no intermediate code at all are obviously possible.)

If, for example, the largest decimal number that could be handled in the array were 9,999, then the highest level or first row of the array would be supplied with the binary equivalent of the decimal number 8,000, the next level would be supplied with the binary equivalent of 4,000, then 2,000 in the third, 1,000 in the fourth, 800 in the fifth, etc. The array is then instructed to subtract, i.e. $\bar{A}$, and the K signals generated by unsatisfied borrows nullify those levels inappropriate to the conversion in the same manner as in the division operation. The K' signals are not generated since they are used only in root extraction or power generation.

The generated K signals also serve to assure that appropriate zeros are inserted in the answer readout device in the same manner as was performed in division and square rooting. Finally, by means of well-known straightforward gating techniques, the answer register is read into, in this case, an 8-4-2-1 to decimal converter, except, in this case also, the array readout is read as values of 1-2-4-8 rather than binary values. This technique is straightforward and is not claimed as part of this invention. The array of trial subtracters for binary to BCD conversion is shown below as an array (23) superimposed on an outline of the slant matrix 10.

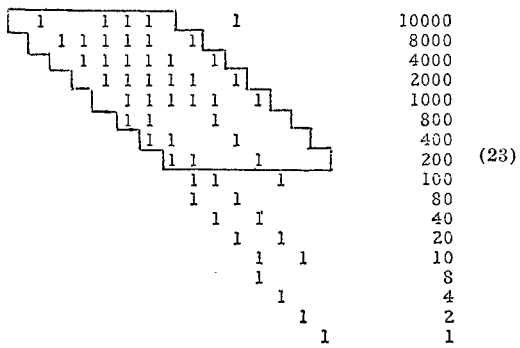

While the invention has been particularly shown and described with reference to preferred embodiments thereof, it will be understood by those skilled in the art that the foregoing and other changes in form and details may be made therein without departing from the spirit and scope of the invention.

What is claimed is:

1. A binary computing complex comprising:
   (a) a slant matrix of arithmetic units arranged in slant columns extending from upper left to lower right, the extreme left unit of each row corresponding to the highest order bit of a binary number associated with that row,
(b) binary bit signal input means connected to each unit,
(c) binary bit signal output means connected to each unit, each of said units being capable of performing an addition or subtraction operation on input bit signals applied to said input means to produce sum and carry or difference and borrow outputs, and
(d) resultant bit signal readout means connected to the output means of the highest order unit of each row.

2. A binary computing complex as defined in claim 1 wherein said units include means for bypassing a unit by transferring input bit signals from said input means to said output means.

3. A binary computing complex as defined in claim 2 further comprising means connecting said output means of all but the highest order units to the input means of the corresponding units in the next lower row.

4. A binary computing complex as defined in claim 3 for performing the operation $A+(B \times C)$ where A, B and C are binary numbers wherein:
(a) said input means comprises first, second and third input terminals, and said complex further comprises
(b) means for applying to the first input terminals of the first row of said matrix binary bit signals representing A,
(c) means for applying to the second input terminals of each row binary bit signals representing one of the numbers B and C,
(d) means connected to the bypassing means of each unit for applying to the bypassing means of all units in each row binary bit signals representing the other of the numbers B and C, each row corresponding to a different digit of said other number, and
(e) means connected to each unit for setting said units in an add mode whereby the resultant bits applied to said readout means represent the number $A+(B \times C)$.

5. A binary computing complex as defined in claim 3 further comprising:
(a) means connected to each unit for setting each unit in an add or subtract mode, and wherein
(b) said input means comprises first, second and third input terminals.

6. A binary computing complex as defined in claim 5 for performing division wherein said arithmetic units are set in the subtract mode and further comprising:
(a) means for applying to said first input terminals of said first row binary bit signals representing a dividend number,
(b) means for applying to said second input terminals of each row binary bit signals representing a divisor number,
(c) said bypassing means being responsive to a negative remainder from the highest order unit of a row to bypass all the units of that row, and
(d) means connected to said readout means and responsive to said bypassing means for supplying to the readout means a binary zero corresponding to the bypassed row.

7. A binary computing complex as defined in claim 5 for performing multiplication wherein said arithmetic units are set in the add mode and further comprising:
(a) means for applying to said second input terminals of each row binary bit signals representing one factor of an answer number to be obtained, and
(b) means connected to the bypassing means of each unit for applying to the bypassing means of all units in each row a signal representing a different bit of the second factor of said answer number, whereby the resultant bits applied to said readout means represent said answer number which is the product of said first and second factors.

8. A binary computing complex as defined in claim 5 for converting from straight binary to decimal numbers further comprising:
(a) means for applying to said first input terminals of said first row corresponding bits of a straight binary number,
(b) means for applying to the second inputs of successive rows, beginning with the first row, bit signals corresponding to the binary equivalents of the decimal partial sums of the largest possible number contained within the applied number,
(c) means connected to said setting means for setting said setting means in a subtract mode, and
(d) means connected to the highest order unit of a row and responsive to an unsatisfied borrow bit for causing that row to be bypassed and a zero to be placed in the readout means, whereby the resultant bits applied to said readout means represent the decimal equivalent of the input binary number.

9. A binary computing complex as defined in claim 1 wherein:
(a) said input means further comprises first, second and third input terminals for each of said units, and
(b) said complex further comprises means for applying to the second input terminals of said matrix binary bit signals corresponding to the following array of binary ones and zeros, the number of rows in said array pattern corresponding to the number of rows in said slant matrix required to perform a desired mathematical operation:

```
         1
       101
      1101
     11101
    111101
   1111101
``` said array capable of being extended to any desired size by shifting each additional row two bit positions to the right relative to the preceding row and adding a binary one bit on the left.

10. A binary computing complex as defined in claim 9 further comprising means connected to each unit for setting each unit in an add or subtract mode.

11. A binary computing complex as defined in claim 10 for performing the operation $A+B^2$, where A and B are binary numbers, further comprising:
(a) means connected to each of said units for converting to an effective binary zero each binary one of said array which corresponds to a partial product of the square of B and one of whose factors corresponds to a zero bit in B,
(b) means for applying to the first input terminals of said first row binary bit signals representing A, and
(c) means connected to said setting means for energizing said setting means to set said units in an add mode whereby the resultant binary bit signals applied to said readout means represent $A+B^2$.

12. A binary computing complex as defined in claim 10 wherein the desired mathematical operation is the squaring of a number and further comprising:
(a) means connected to each of said units for converting to an effective binary zero each binary one of said array which corresponds to a partial product of the square of said number and one of whose factors corresponds to a zero bit in said number, and
(b) means connected to said setting means for energizing said setting means to set said units in an add mode, whereby successive rows of said converted array are added to said number so that the resultant binary bits applied to said readout means represent the square of said number.

13. A binary computing complex as defined in claim 12 further comprising means connected to each of said units for converting to a zero all the bits in a slant column of the array, which column must contain all zeros because it contains a common factor which is a zero in said number.

14. A binary computing complex as defined in claim 10 wherein the desired mathematical operation is the extraction of the square root of a binary number comprising:
 (a) means for applying signals representing the individual bits of said number to said first input terminals of said first row of units, and
 (b) means for energizing said setting means to set said units in a subtract mode to subtract successive rows of said array from said number, whereby the resultant bit signals applied to said readout means represent the square root of said number.

15. A binary computing complex as defined in claim 14 further comprising means connected to the highest order unit of a row and responsive to a negative remainder bit for causing the units of that row to be bypassed so that the bit signals applied to the first input terminals thereof to be reproduced at the bit signal output means thereof.

16. A binary computing complex as defined in claim 15 further comprising means connected to said output means of the highest order unit of each row and responsive to said bypassing means to supply a binary zero to said readout means.

17. A binary computing complex as defined in claim 16 further comprising means connected to said bypassing means for converting to zero all the bits in a slant column of said array, which column must contain all zeros because of its mathematical relationship to a bypassed row.

18. An array generator for generating the following array of numbers for use in a squaring or in a square rooting calculation apparatus:

```
1
101
01101
0011101
000111101
00001111101
``` and comprising:
 (a) a shift register having a plurality of stages numbered 0, 1, 2, 3 . . . and
 (b) means connected to said shift register for storing a binary 1 in stage 1 thereby storing in said register the first number of said array,
 (c) first logic means connected to said shift register and responsive to the presence of a binary 1 in stage 1 for storing binary 1's in stages 0 and 2,
 (d) second logic means connected to said shift register for changing the binary 1 in stage 1 to a binary 0,
 (e) shifting means connected to said shift register for shifting the contents of the shift register one stage in the direction of the highest numbered stage, thereby storing the second array number 101 in stages 1, 2 and 3, respectively, of said shift register,
 (f) said first logic means being responsive to a 1 in stage 3 for changing the 0 in stage 2 to a 1 and storing a 1 in stage 4,
 (g) said second logic means changing the 1 in stage 3 to a 0,
 (h) said shifting means thereafter shifting the contents of said register one stage in the direction of the highest ordered stage, thereby storing the third array number 01101 in stages 1, 2, 3, 4 and 5, respectively, of said shift register, whereby the first number in the array is a high order binary 1, the next array number is obtained by effectively adding a binary pair of bits 11 to said high order bit with the lowest order bit of the pair being in the same order as said high order bit with carries transmitted to the right, and each subsequent array number is obtained by adding a binary pair of bits in like manner to the two lowest order bits of the next preceding array number, and
 (i) output means connected to said shift register for sequentially producing electrical signals corresponding to each of said array numbers.

19. An array generator as defined in claim 18 further comprising means connected to said first and second logic means responsive to an external signal for inhibiting selected ones of said storing and changing operations to modify the number stored in said shift register.

20. A squaring apparatus comprising in combination with the array generator defined in claim 18
 (a) an input register,
 (b) a storage register,
 (c) means connected to said input register for applying an input number to said input register,
 (d) an adder comprising a plurality of stages each connected to a different stage of said storage register,
 (e) means connected to said adder for applying the electrical signals from said output means of said shift register to said adder,
 (f) a sum register connected to said adder which at the completion of the operation will contain the answer,
 (g) means connected to said sum register for sequentially storing in said sum register numbers representing the sum of the number in said storage register and each of the array numbers when said input register has a 1 in the readout position, and
 (h) means connected between said sum register and said storage register for transferring the number in said sum register to said storage register.

21. A squaring apparatus comprising in combination with the array generator defined in claim 18,
 (a) an input register for storing the bits of an input number to be squared,
 (b) an adder,
 (c) an initially empty partial sum register,
 (d) a total register,
 (e) third logic means connected to said input register and responsive to each binary "1" bit in said input number to apply the corresponding array number to said adder,
 (f) means connected between said adder and said total register for sequentially storing in said total register the sum of each array number and the contents of said partial sum register,
 (g) means connected between said total register and said partial sum register for transferring the contents of said total register to said partial sum register, and
 (h) means connected to said third logic means and responsive to a "0" bit in said input number for inhibiting said third logic means and modifying the next number in said array, whereby the square of said input number is stored in said total register.

22. A square rooting apparatus comprising in combination with the array generator defined in claim 18
 (a) an input register,
 (b) means connected to said input register for applying an input number to said input register,
 (c) a subtracter comprising a plurality of stages each connected to a different stage of said input register,
 (d) means connected between said output means and said subtracter for applying the electrical signals from said output means to said subtracter,
 (e) a difference register connected to said subtracter,
 (f) means connected to said difference register for sequentially storing in said difference register numbers representing the difference between the number in said input register and each of the array numbers when the difference is not negative,
 (g) an answer register,
 (h) means connected to said answer register responsive to each non-negative difference number in said difference register for storing a 1 in said answer register, and
 (i) means connected between said difference register and said input register for transferring the number in said difference register to said input register.

23. A square rooting apparatus as defined in claim 22 further comprising:
   (a) means connected to said difference register for storing in said difference register the number in said input register when the difference between an array number and the number in said input register is negative, and
   (b) means connected to said subtracter and responsive to a negative difference to store a 0 in said answer register.

References Cited

UNITED STATES PATENTS

| | | | |
|---|---|---|---|
| 3,346,729 | 10/1967 | Dell et al. | 235—164 |
| 2,934,268 | 4/1960 | Felker | 235—158 |
| 3,374,463 | 3/1968 | Muir | 235—164 X |

EUGENE G. BOTZ, Primary Examiner

D. H. MULZAHN, Assistant Examiner

U.S. Cl. X.R.

235—155, 158; 307—221; 328—37